Oct. 5, 1943.                    W. G. LYMAN                    2,331,211
                    BICYCLE BASKET OR SIMILAR RECEPTACLE
                    Filed May 27, 1940              2 Sheets-Sheet 2
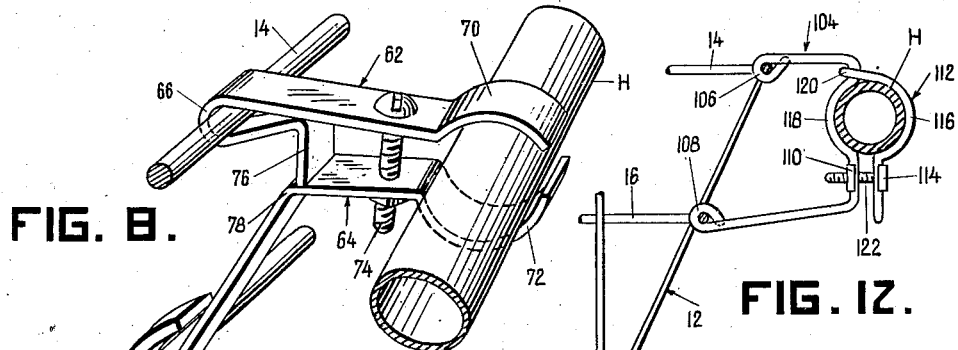
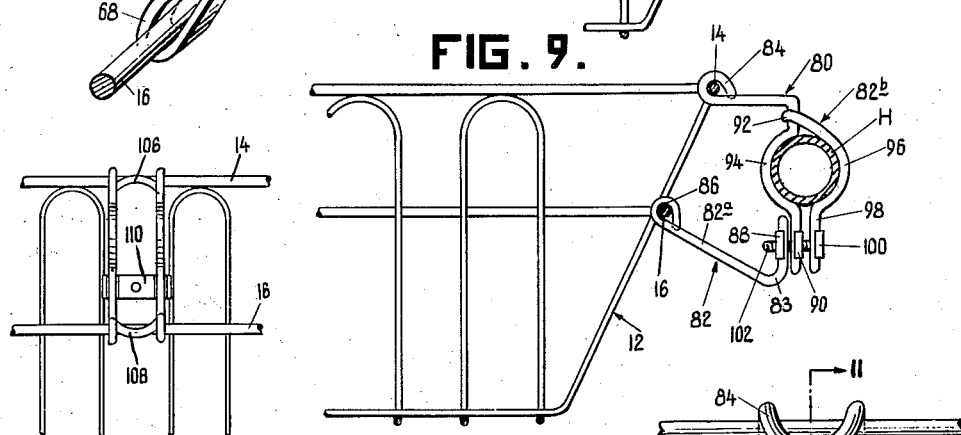
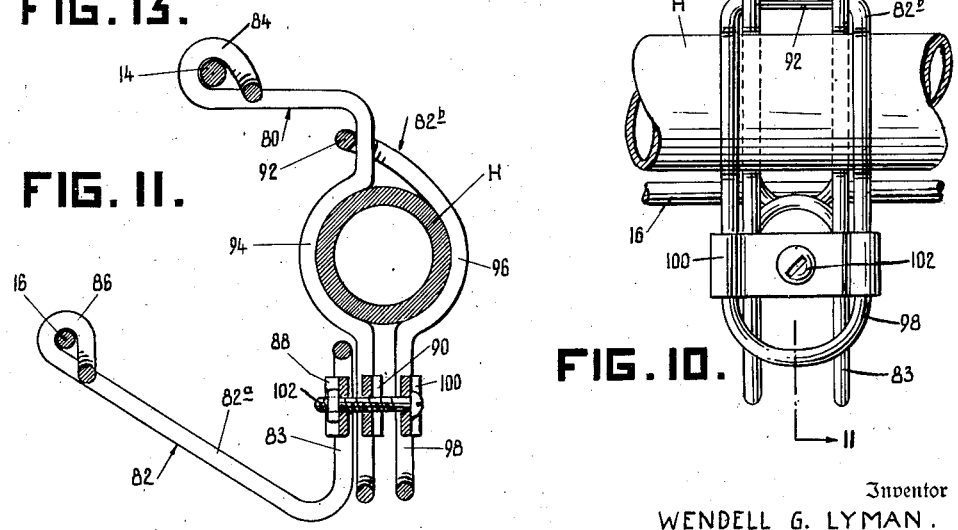
Inventor
WENDELL G. LYMAN.
By
Attorney Patented Oct. 5, 1943

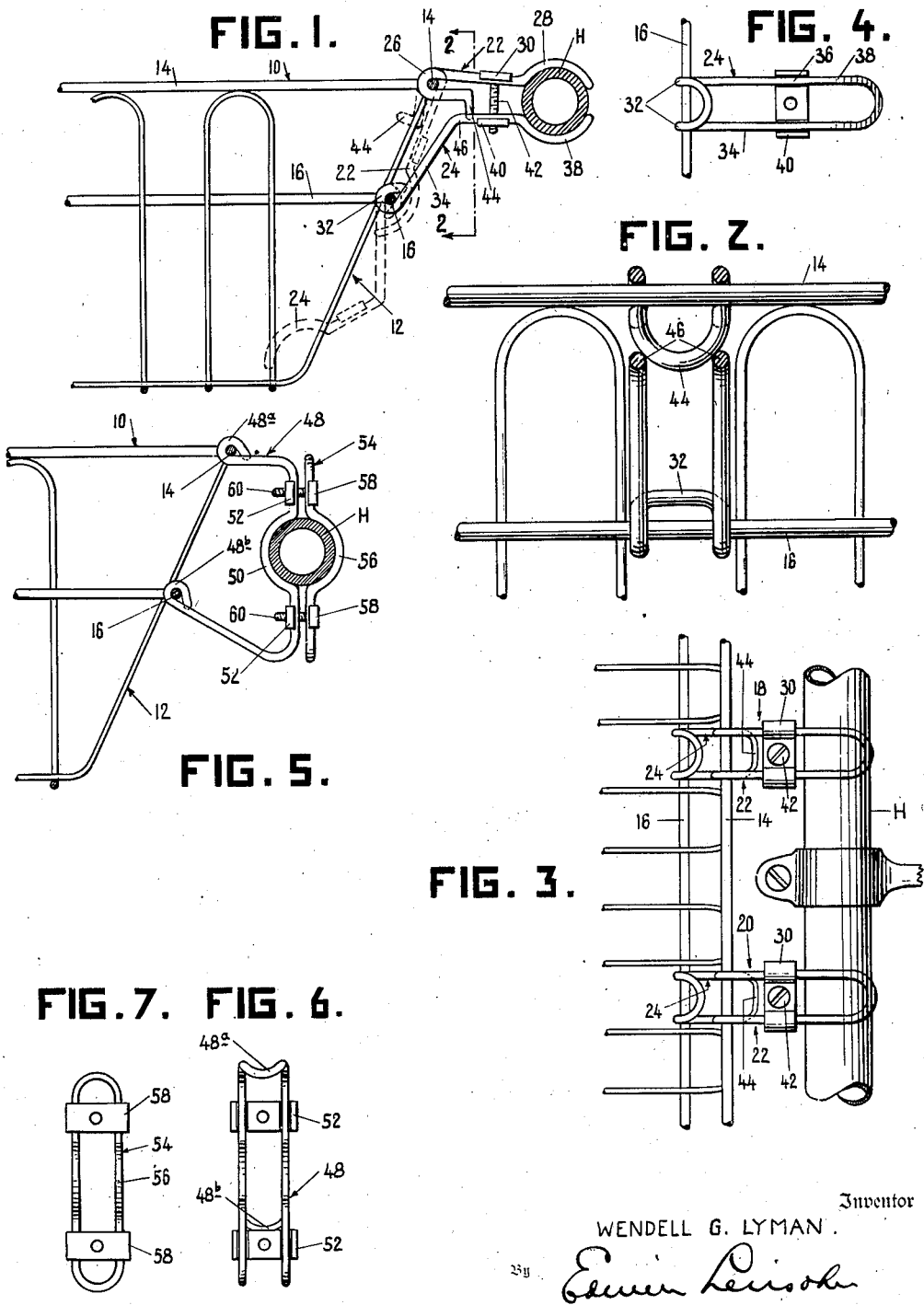

2,331,211

UNITED STATES PATENT OFFICE 2,331,211

BICYCLE BASKET OR SIMILAR RECEPTACLE

Wendell G. Lyman, Brooklyn, N. Y., assignor to D. P. Harris Hardware & Manufacturing Co. Inc., New York, N. Y., a corporation of New York Application May 27, 1940, Serial No. 337,377

2 Claims. (Cl. 224—36)

This invention relates to bicycle baskets or similar receptacles constructed and arranged to be attached to the handle bars of the bicycles.

One object of the invention is the provision of a bicycle basket or similar receptacle provided with clamping members for securing the basket to the handle bar of the bicycle and foldably secured to the basket in such manner that said clamping members can be so positioned as to permit a plurality of baskets with the clamping members attached thereto to be disposed in nested relation to facilitate shipment of such baskets and to reduce the space required for a stock supply thereof.

Another object of the invention is the provision of a bicycle basket having companion clamping members formed of endless wire loops. More specifically, this object of the invention contemplates not only the provision of clamping members which are foldably related to the basket to which they are attached but also clamping members which may be secured to the basket in non-movable relation thereto.

Another object of the invention is to provide companion clamping members which have curved portions adapted to engage the handle bar in clamping relation therewith and which have parts at opposite sides of said curved clamping portions adapted to be held in such relation with respect to each other as to secure said clamping portions in clamping engagement with the handle bar.

A further object of the invention is the provision of a basket with companion clamping members having parts secured to the basket, clamping parts engageable with the handle bar, and intermediate interengaging parts to counteract the clamping pressure of said handle bar clamping parts, whereby to prevent the transmission of harmful forces to the basket, thus to prevent injury to the basket.

A yet further object of the invention is generally to provide a bicycle basket or similar receptacle with improved clamping means for securing the receptacle to the bicycle.

The above objects of the invention as well as objects ancillary to the specified objects will be fully understood from the following description, reference being had to the accompanying illustrative drawings.

In the drawings:

Fig. 1 is a side view, with parts in section, of part of a bicycle basket provided with clamping members embodying the present invention, showing the basket attached to the handle bar of a bicycle, said handle bar being shown in section;

Fig. 2 is a sectional view on the line 2—2 of Fig. 1;

Fig. 3 is a top plan view of the bicycle basket illustrated in Fig. 1 shown secured to a bicycle handle bar by spaced pairs of companion clamping members;

Fig. 4 is a top plan view of the lower clamping member shown in Fig. 1;

Fig. 5 is a view similar to Fig. 1 showing clamping members made in accordance with another form of the invention;

Figs. 6 and 7 are front views of the respective clamping members shown in Fig. 5, said clamping members being detached from the basket and disconnected from each other;

Fig. 8 is a perspective view of companion clamping members similar to the clamping members illustrated in Fig. 1 but formed of metal straps instead of wire;

Fig. 9 is a view similar to Fig. 1 showing clamping members made in accordance with another form of the invention;

Fig. 10 is a rear view in elevation of part of the basket shown in Fig. 9;

Fig. 11 is a sectional view on the line 11—11 of Fig. 10;

Fig. 12 is a view similar to Fig. 5 showing clamping members made in accordance with another form of the invention;

Fig. 13 is a rear view of one of the clamping members shown in Fig. 12 secured to the basket.

Referring now to the drawings in detail and first to the form of the invention illustrated in Figs. 1 to 4, the bicycle basket 10 is, as here shown, formed of metal wire and comprises an upwardly and rearwardly inclined wall 12 including part of the top wire 14 and the intermediate wire 16 which, it will be understood, extend peripherally of the basket completely therearound. As the present invention is concerned more particularly with the clamping members by which the basket is secured to the handle bar of the bicycle, further description of the basket is unnecessary and it will be understood that said basket can be of any suitable construction, for example, the construction illustrated in my application, Serial No. 316,554, filed January 31, 1940, which is preferred.

As stated above, an important feature of the present invention resides in providing clamping members which are associated with the basket in such manner that said clamping members can be disposed in retracted position such that a plurality of baskets provided with said clamping members can be nested one within the other, said clamping members of each basket being movable to projected position which is illustrated in Fig. 1 for securing the basket to the handle bar H of a bicycle.

As here shown, there are two sets or pairs 18 and 20 (Fig. 3) of companion clamping members 22 and 24, respectively, formed of stiff but resilient wire. Clamping member 22 is in the form of an endless wire loop and is pivotally secured at one end thereof to the top wire 14 of the basket, for which purpose a portion of said clamping member adjacent one end thereof is looped around wire 14 as indicated at 26. The outer end portion 28 of clamping member 22 is arcuately curved for engagement with one side of the handle bar H. A clip 30 of sheet metal is welded or otherwise fixed to the sides of said clamping member. Clamping member 24 is also in the form of an endless wire loop and is also pivotally secured to the basket at a point below companion clamping member 22, and more particularly is pivotally secured to wire 16 thereof, for which purpose said clamping member has an end portion 32 thereof looped around wire 16. Clamping member 24 has a part 34 which extends upwardly from end portion 32, in the projected or operative position of said clamping member, a horizontally extending part 36 and an arcuately curved handle bar clamping portion 38 which engages the handle bar and which together with the oppositely curved arcuate portion 28 of clamping member 22 constitute the companion clamping portions of said clamping members. A sheet metal clip 40 is welded or otherwise fixed to part 36 of clamping member 24, clips 30 and 40 being provided with aligned openings for engagement with said clips of the clamping bolt 42.

It will be understood that clamping portions 28 and 38 of each pair of clamping members 22 and 24 are forced against opposite sides of the handle bar H as tightly as may be necessary by means of the bolts 42. A reaction abutment for the pressure of the clamping members on the handle bar is provided by interengaging portions on the companion clamping members. For this purpose the looped portion 44 of clamping member 22 is disposed for bearing engagement with the confronting portions 46 of companion clamping member 24 adjacent the upper end of upwardly extending part 34. It will be understood that when the basket is detached from the handle bar, bolts 42 can be disengaged from one or both of the companion clamping members whereby to permit said clamping members to be moved to retracted positions adjacent rear wall 12 in positions lying generally parallel to said wall of the basket as indicated in dotted lines in Fig. 1. Ordinarily, the clamping members will be positioned in said retracted position when the baskets are shipped from the factory so that a plurality of baskets can be arranged in nested relation to save room or when the baskets are in stock or storage but, on the other hand, the baskets can be readily secured to the handle bars by moving the clamping members to the operative position thereof illustrated in Figs. 1 and 3 and secured in said position clamped to the handle bar of the basket by engagement of the clamping bolts 42 as described above.

It will be noted that the clamping members are formed as endless wire loops. This clamping member construction is desirable not only when the clamping members are pivotally secured to the basket as illustrated in Fig. 1 but also in the absence of such pivotal securement as, for example, when one of the clamping members is secured to the basket in fixed relation thereto. This is illustrated in Figs. 5 to 7 of the drawings. As here shown clamping member 48 has upper and lower end portions 48a and 48b, respectively, bent around and fixed to upper wire 14 and intermediate wire 16, respectively, of the basket. Said clamping member 48 has an intermediate arcuate portion 50 adapted to engage the handle bar H of the bicycle and is provided with metal clips 52 welded or otherwise fixedly secured to said clamping member at opposite sides of said arcuate portion thereof. The companion clamping member 54 is also formed of an endless wire loop and has a bent arcuate portion 56 arranged to engage the other side of the handle bar, there being clips 58 secured to clamping member 54 at opposite sides of its arcuate portion 56 in position to confront clips 52 of companion clamping member 48. Clips 52 and 58 are provided with apertures for the clamping bolts 60 by which the companion clamping members 48 and 54 are fastened to the handle bar.

In the form of the invention illustrated in Fig. 8 the companion clamping members are formed of stiff but resilient metal bars or straps. As here shown the companion clamping members 62 and 64 have end portions 66 and 68, respectively, bent around the basket wires 14 and 16, respectively, for pivotally securing said clamping members thereto, and said companion clamping members have oppositely curved arcuate portions 70 and 72 for engaging the handle bar H in clamping relation therewith. The intermediate portions of the companion clamping members are adjustably engaged by a bolt 74 for holding said members in clamping relation and for adjusting the clamping pressure of said clamping members on the handle bar. Clamping members 62 and 64 are, like clamping members 22 and 24, provided with means to counteract the clamping pressure exerted on clamping portions 70 and 72 by bolt 74. Thus, as here shown, clamping member 62 has a projecting portion 76 disposed between the ends thereof in bearing engagement with a portion 78 of companion clamping member 64, said portion being disposed between the ends of said clamping member. It will be understood that companion clamping members 62 and 64 can be moved from the projected or operative position illustrated in Fig. 8 to a retracted position in which said companion clamping members lie adjacent the rear wall of the basket in positions approximately parallel to said rear wall.

In the form of the invention illustrated in Figs. 9 to 11, one of the clamping members comprises two separable parts 80 and 82, secured to the basket, and a third part 82b which coacts with part 80 in clamping relation on the handle bar. Each of said parts is preferably constituted by an endless wire loop. Part 82 has a downwardly inclined portion 82a and is provided with an upwardly bent portion 83 having a sheet metal clip 88 secured thereto in position to confront the sheet metal clip 90 of clamping part 80. Clamping part 82b has an end portion 92 which engages clamping part 80 at one side of the handle bar clamping portion 94 of clamping part 80. Said clamping part 82b is provided with a companion handle bar clamping portion 96 and with an end portion 98 which is provided with a sheet metal clip 100 disposed in confronting relation to clips 88 and 90. Said clips are each provided with an opening for the passage through said clips of a clamping bolt 102 for tightening arcuate clamping portions 94 and 96 against opposite sides of the handle bar H. It will be understood that when the clamping bolt is disengaged from the clips, parts 80 and 82 can be moved to retracted position in which said parts lie adjacent the rear wall 12 of the basket in a direction approximately parallel thereto as in the case of the above described pivotally mounted clamping members illustrated in Figs. 1 and 8 and their respective associated figures of the drawings. In the construction shown in Figs. 9 to 11, one clamping member can be considered as comprising the parts 80 and 82, said clamping member being thus of sectional construction, while the other clamping member is constituted by part 82b.

In the form of the invention illustrated in Figs. 12 and 13 the companion clamping members embody certain of the features of the clamping members illustrated in Fig. 5 and certain of the features of the clamping members illustrated in Fig. 9. Thus, referring to Figs. 12 and 13, it will be observed that clamping member 104 is formed of an endless wire loop and is somewhat similar to clamping member 48 illustrated in Fig. 5, said clamping member 104 being fixed at its ends to the upper and intermediate wires 14 and 16 of the basket by the bent end portion 106 and 108, respectively, which engage said wires. In this form of the invention, however, clamping member 104 has only one bolt clip as indicated at 110. Companion clamping member 112 is likewise provided with only one bolt clip as indicated at 114, at one side of the arcuate clamping portion 116 of said clamping member which cooperates with the arcuate portion 118 of companion clamping member 104 for securing the basket to the handle bar H. In lieu of the other set of clips, i. e., the upper clips of the clamping members shown in Fig. 5 clamping member 112 is engaged with clamping member 104 in the same manner as clamping member 80 and part 82b of companion clamping member 82 of the construction illustrated in Fig. 9. Thus, as here shown, the looped end 120 of clamping member 116 engages clamping member 104 at one side of the arcuate portion 118 thereof opposite the side to which clip 110 is secured. A clamping bolt 122 engages clips 110 and 114 for holding clamping portions 116 and 118 of the companion clamping members in clamping relation on the handle bar.

Thus it is seen that the constructions hereinbefore described are well adapted to accomplish the several objects of the invention. It will be understood, however, that the invention may be embodied otherwise than as herein specifically illustrated or described and that in each of the illustrated and described forms of the invention certain changes in the details of construction and in the arrangement of parts may be made and will occur to skilled artisans particularly in view of the present disclosure. Therefore, I do not wish to be limited to the invention as herein shown or described or to any of the forms thereof except as may be required by the scope of the present claims.

Having thus described my invention, what I claim and desire to secure by Letters Patent is:

1. A receptacle constructed and arranged to be secured to the handle bar of a bicycle and for that purpose provided with companion clamping members, said clamping members being pivotally connected to the receptacle and having portions engageable with the handle bar, and means adjustably engageable with parts of said clamping members for holding said portions thereof in clamping relation with said handle bar, said clamping members having parts engageable with each other at a point between said parts and the pivotally connected ends of said clamping members to counteract the clamping pressure of said holding means.

2. A receptacle constructed and arranged to be secured to the handle bar of a bicycle and for that purpose provided with companion clamping members, said clamping members being pivotally connected to the receptacle and having portions engageable with the handle bar, each of said clamping members comprising a closed wire loop having spaced wire portions and a curved handle-bar clamping portion, a clip fixedly secured at its opposite ends to said spaced wire portions, respectively, adjacent said curved clamping portion, the clips and the curved portions of the companion clamping members confronting each other in the handle-bar clamping position of said clamping members, and means adjustably engageable with said clips for holding said curved portions in clamping relation, said clamping members having parts engageable with each other at a point between said clips and the pivotally connected ends of said clamping members to counteract the clamping pressure of said holding means.

WENDELL G. LYMAN.